J. LIPPERT.
GAUGE.
APPLICATION FILED MAY 23, 1919.
1,403,795.
Patented Jan. 17, 1922.
2 SHEETS—SHEET 2.
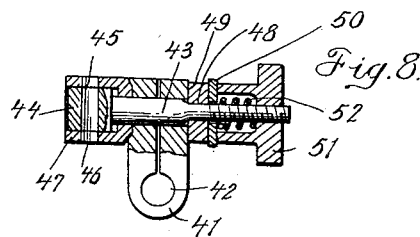
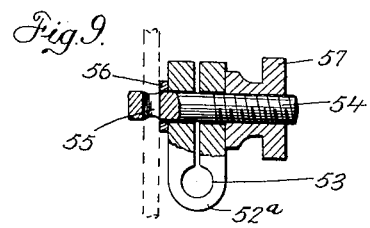
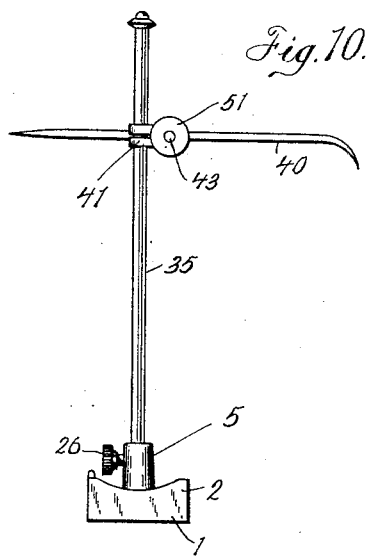
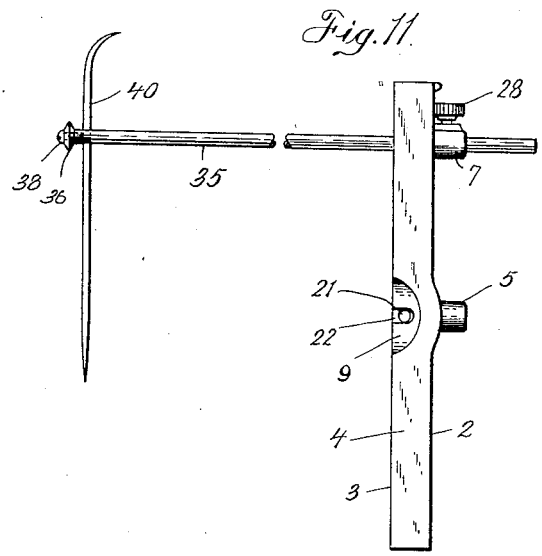
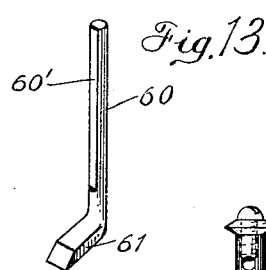
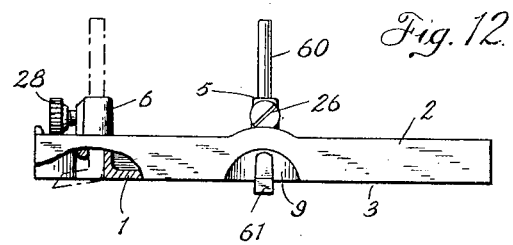
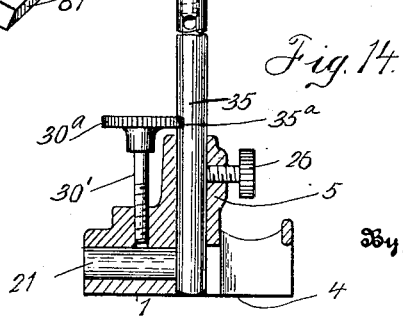
Inventor
Joseph Lippert
By his Attorney

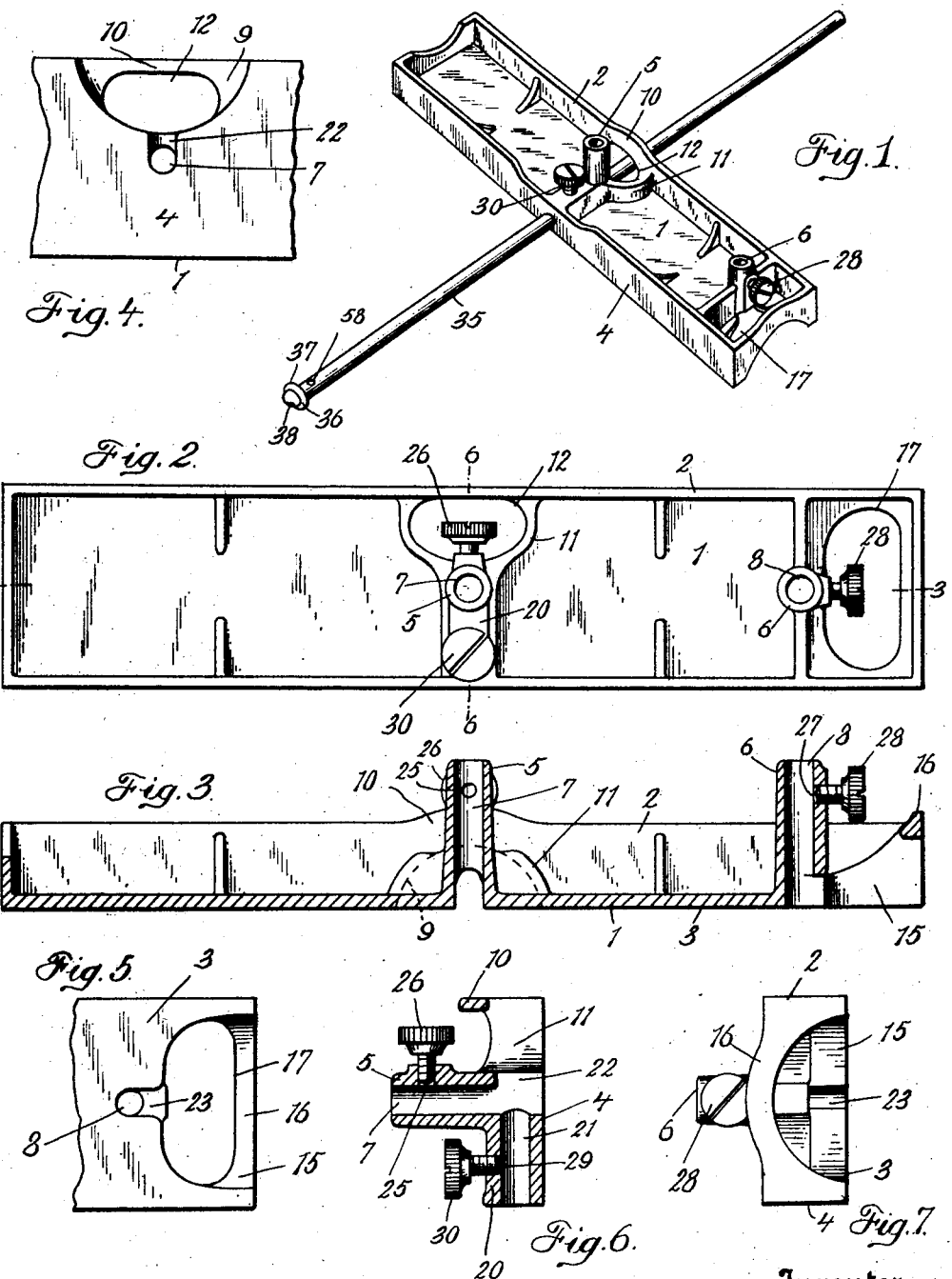

UNITED STATES PATENT OFFICE.

JOSEPH LIPPERT, OF JERSEY CITY, NEW JERSEY.

GAUGE.

1,403,795. Specification of Letters Patent. Patented Jan. 17, 1922.

Application filed May 23, 1919. Serial No. 299,232.

*To all whom it may concern:*

Be it known that I, JOSEPH LIPPERT, a citizen of the United States, residing at Jersey City, county of Hudson, and State of New Jersey, have invented certain new and useful Improvements in Gauges, of which the following is a specification.

This invention relates generally to gauges such as are used by mechanics in measuring or laying off work of different kinds and it has for a principle object to provide a simple form of combination gauge which may be used in different kinds of work.

A further object is to provide a novel form of base or holder adapted to carry different gauge elements.

For further comprehension of the invention and of the objects and advantages thereof, reference will be had to the following description and accompanying drawings, and to the appended claims in which the various novel features of the invention are more particularly set forth.

Figure 1 of the drawing is a perspective view of my improved gauge arranged as a panel gauge.

Figure 2 is a plan view of the base or holder.

Figure 3 is a longitudinal sectional view of the base taken on the line 3—3 of Fig. 2.

Figure 4 is a fragmentary bottom plan view showing the central portion of the holder.

Figure 5 is a similar view of one end of the holder.

Figure 6 is a transverse section on the line 6—6 of Fig. 2.

Figure 7 is an end view of the holder.

Figure 8 is a detail view of the clamp for securing the feeler in place.

Figure 9 is a detail view of a modified form of clamp.

Figure 10 is an end elevation showing my gauge used as a surface gauge.

Figure 11 is a side elevation showing it used as a drop gauge.

Figure 12 is a side view showing it used as a router plane.

Figure 13 is a perspective view of the router tool.

Figure 14 is a transverse sectional view showing a modified arrangement for adjusting the gauge bar.

Figure 15 is a plan view of the combined adjusting and set screw shown in Fig. 14.

My improved combination gauge comprises a base or holder which may be of oblong form as seen in plan view and comprises a plate portion 1 surrounded by an upstanding flange 2.

The plate portion 1 has the bottom face 3 thereof, which is opposite to the flange 2, milled or planed to provide a perfectly smooth and flat surface, while one face, 4, of the flange 2 is similarly milled at right angles to the face 3.

Projecting upwardly from the plate 1 are a pair of bosses 5 and 6 one of which is located substantially midway between the ends of the plate, and the other near one end thereof. These bosses have vertical perforations 7 and 8 extending therethrough, these perforations being of equal diameter so that the gauge holders may be interchanged from one to the other as desired.

The plate 1 and flange 2 are cut out adjacent the boss 5 to form a semi-circular recess 9 facing outwardly to the side of the plate, the upper portion of the flange bridging over this recess as shown at 10, while the plate is extended upwardly in the form of an enclosing wall 11, leaving an opening 12 between this wall and the bridge piece 10.

A similar recess 15 which faces outwardly toward the end of the plate if formed adjacent the boss 6, the flange 2 bridging over the recess 15 as shown at 16 to leave an opening 17.

A rib 20 extends between the boss 5 and the flange 2 on the side opposite to the recess 9, this rib being formed with an aperture 21 which extends transversely to the face 4 and intersects the vertical aperture 7, the recess 9 being extended inwardly as at 22. Similarly the recess 15 is extended inwardly as at 23 to the perforation 8, these extensions being formed to accommodate the feet of a router gauge to be presently referred to. A threaded opening 25 leads through the wall of the boss 5 into the perforation 7 and has a set screw 26 screwed therein. A similar opening 27 in which is a set screw 28 leads through the boss 6 into the perforation 8, while a similar opening 29 leads into the perforation 21 and contains a set screw 30.

This base or holder provides for the use of different positions for use on different work. One of the gauge members I provide consists of a rod or post 35 of a diameter to fit slidably in the perforations 7, 8 and 21 and having secured to one end a disk 36 having a sharpened scoring or marking edge 37, this disk being secured in place by a screw 38 threaded into a suitable socket in the end of the rod.

This rod may be inserted in the horizontal perforation 21, with the end thereof which carries the disk 36 projecting from the face 4, thus forming a panel gauge, the face 4 being placed against the edge of the work with the rod 35 projecting thereover, so that by moving the holder along the edge, the disk will score or mark the work parallel to such edge. If desired the rod may be reversed in the perforation with the other end projecting from the face 4, thus providing a convenient depth gage.

For use as a surface gauge or drop gauge the rod 35 carries a feeler or finger 40 which may be secured thereto by a clamp which may be of the well known construction illustrated in Fig. 8 and comprising a split clamp 31 having an opening 42 in which the rod slides freely. A screw 43 passes through the ears of this clamp and is formed with a head 44 in which is a transverse perforation 45 adapted to register with a pair of perforations 46 in a cup 47 in which the head slides. The screw has a flattened portion 48 which passes through a complementary washer 49 adjacent which is a second washer 50. A recessed nut 51 is threaded on the screw and bears on the washer 50, this nut carrying a coiled spring 52. With this arrangement the finger 40 is secured in the clamp and the latter tightened on the post 35 by simply tightening the nut 51.

In Fig. 9 I have illustrated a novel clamp which I may use, comprising a split clamp 52$^a$ having an opening 53 for the rod 35. A screw 54 passes through the ears of this clamp and has a transverse perforation 55 at one end to receive the finger 40, a washer 56 being interposed between the finger and the face of the clamp. A nut 57 is threaded on the opposite end of the screw 54. Tightening of the nut causes both the finger 40 and the rod 35 to be clamped in position, as will be apparent.

The clamp may be dispensed with as in Fig. 11 and the feeler passed through a transverse perforation 58 in the rod 35 into which screw 38 projects, the screw being loosened and tightened on the feeler.

In using my device as a surface gauge the rod 35 may be inserted in either of the perforations 7 and 8 with the finger 40 projecting outwardly in the desired position the face 3 resting on a suitable surface.

In Fig. 11 my device is shown arranged for use as a drop gauge. In this arrangement the rod 35 is reversed in position from its use as a surface gauge, and projects from the surface 3 of the holder which is placed vertically against the side of the work, the rod 35 projecting over the work and the finger 40 carried at any suitable angle.

In Fig. 12 I show my device arranged for use as a router plane with which grooves or the like can be finished off to the desired depth. In this arrangement a round bar 60 flattened on one side as at 60′ and having at its lower end a laterally projecting chisel-like foot 61 may be secured either in the perforation 8, as shown in dotted lines, or in the perforation 7 as shown in full lines, the foot 61 projecting outwardly across the recess, 9 or 15, while the extensions 22 and 23 permit of the foot being raised to bring its cutting edge close to the level of the surface 3. The arrangement of the recesses permits of inspection of the tool and work during use and provides a clearance way for the shavings or the like.

In Fig. 14 I have shown the gauge bar 35 as provided with a notch 35$^a$ while the set screw 30′, corresponding to the set screw 30, is lengthened and has its head 30$^a$ extending over the boss 5 on the holder to engage in the said notch. By rotating the set screw 30′ a delicate adjustment of the gauge bar 35 is effected, when in use as a drop or surface gauge. To permit of insertion or withdrawal of the rod 35 the head 30$^a$ is formed with a notch 30$^b$ which is brought into registry with the rod when the latter is to be withdrawn.

As will be apparent I have devised an implement which provides at a minimum cost a combination gauge which may be used in measuring or laying off various kinds of work. It will be apparent of course that my improved holder might be used in connection with other and additional gauging devices and its use be extended, and that various changes and modifications might be made in my improved combination gauge without departing from the spirit and scope of the invention as defined in the appended claims.

Having thus described my invention what I claim as new, and desire to secure by Letters Patent, is:—

1. A holder for a tool comprising an oblong base having a pair of apertures extending vertically therethrough to receive a tool, one of said apertures being located at the centre of said base and the other adjacent one end thereof, said base being formed with a pair of recesses located respectively between the first aperture and the side of the base and the second aperture and the end of the base, said base being formed on its bottom with a recess adjacent the lower end of said aperture.

2. A holder for a gauge comprising an oblong base having a pair of vertical apertures one near the centre and one near the end thereof, and a horizontal transverse aperture intersecting one of said vertical apertures, and means for securing a gauge member in any one of said apertures.

3. A holder for a gauge comprising an oblong base plate having an upstanding flange extending therearound, a pair of vertically perforated bosses projecting upwardly from said plate, one near the centre and one near the end thereof, said plate and flange being recessed adjacent said bosses, for the purpose set forth.

4. A holder for a gauge comprising an oblong base having an aperture extending vertically therethrough to receive a tool, said base being formed on its bottom with a recess extending from the side of the plate to the said aperture, for the purpose set forth.

5. A holder for a gauge comprising an oblong base plate having an upstanding flange extending therearound, a pair of vertically perforated bosses projecting upwardly from said plate, a horizontally perforated rib extending transeversely of the plate from one of the said bosses to the said flange, the perforations of the said rib and boss intersecting one another, the bottom of said plate being formed with recesses extending inwardly respectively from the end of the plate, and the side opposite to the said rib, to the said bosses.

6. A holder for a gauge comprising an oblong base plate having an upstanding flange extending therearound, a pair of vertically perforated bosses projecting upwardly from said plate, a horizontally perforated rib extending transversely of the plate from one of the said bosses to the said flange, the perforations of the said rib and boss intersecting one another, the bottom of said plate being formed with recesses extending inwardly respectively from the end of the plate, and the side opposite to the said rib, to the said bosses, said recesses having extensions opening into the said vertical perforations.

7. In a gauge, a surfaced base member, a gauge rod slidable in said member, and having a transverse recess in the side thereof, a screw threaded into said base member and having the head thereof engaging with said recess.

8. In a gauge, a surfaced base member, a gauge rod slidable in said member, and having a transverse recess in the side thereof, a screw threaded into said base member and having the head thereof engaging with said recess, the said head having a notch in the side thereof extending therethrough.

In testimony whereof I have affixed my signature.

JOSEPH LIPPERT.